Aug. 26, 1952  H. G. BECK  2,607,966
REFRIGERATOR GASKET AND SEAL
Filed April 18, 1950
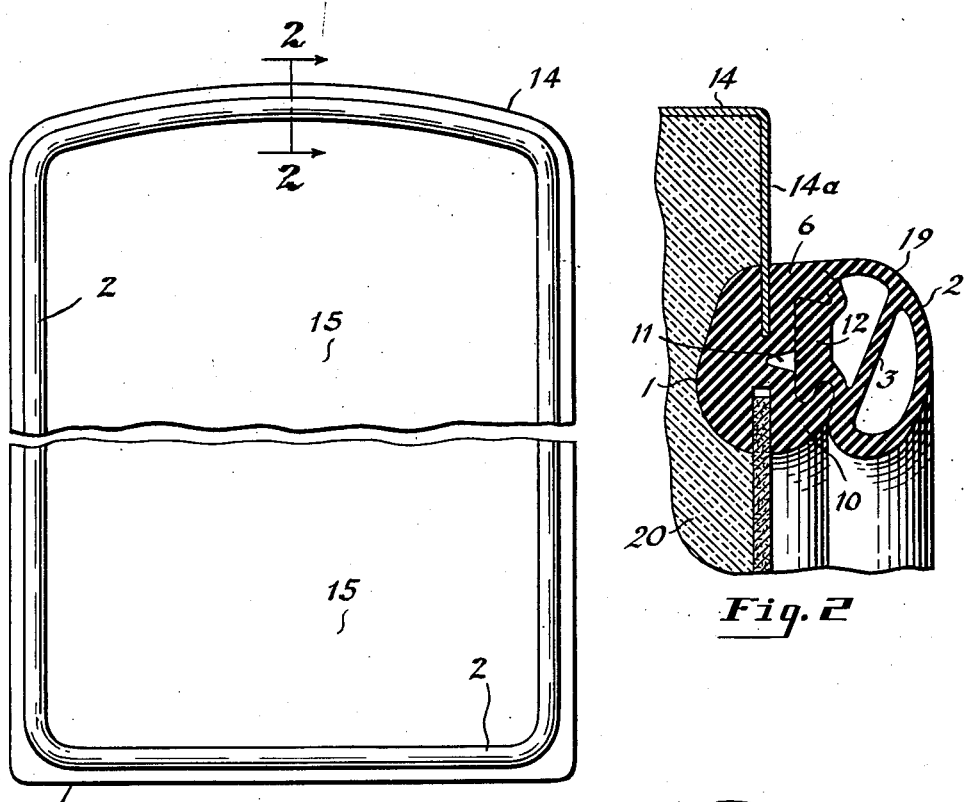
Fig. 1
Fig. 2
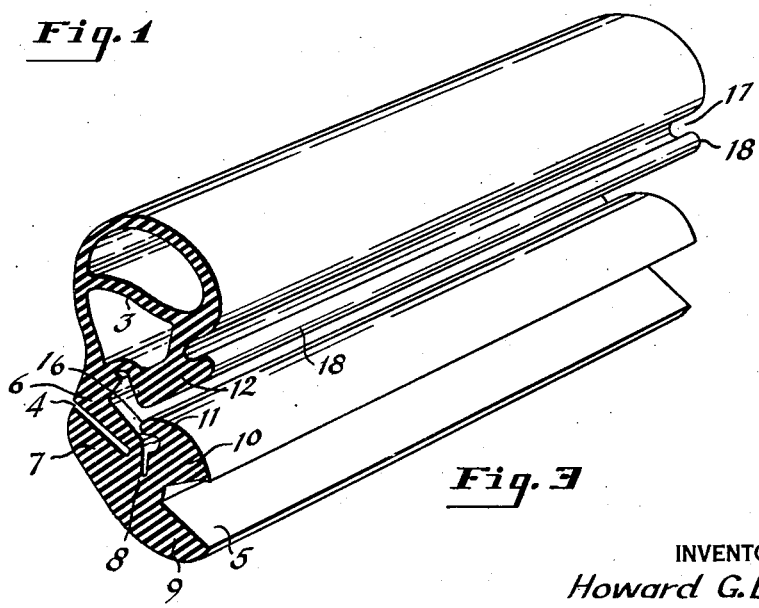
Fig. 3
INVENTOR
Howard G. Beck
BY Evans + McCoy
ATTORNEYS Patented Aug. 26, 1952

2,607,966

UNITED STATES PATENT OFFICE 2,607,966

REFRIGERATOR GASKET AND SEAL

Howard G. Beck, Wabash, Ind., assignor to The General Tire and Rubber Company, Akron, Ohio, a corporation of Ohio Application April 18, 1950, Serial No. 156,581

5 Claims. (Cl. 20—69)

This invention relates to a rubber seal or gasket for use as a closure unit in connection with rubber mountings for joining adjacent panel edges, and in particular this invention relates to a mounting and seal in combination for use on refrigerator doors and the like.

Adjacent panel edges are often joined together by a linear rubber mounting having opposed channels or grooves for receiving the panel edges and means by which to expand the mounting body and cause it to grip and hold the panel edges firmly in the channels. In some cases, an additional closure unit or sealing means is required to seal the panel thus formed against a third surface. Examples of this are refrigerator doors and the tops and lids of insulated chests and boxes.

In refrigerators, insulated chests, and the like, it is desirable to provide a break between the continuity of the inside of the door or lid and the outside surface so that heat is not conducted through the door frame or panels from the surrounding atmosphere into the cooling unit. When the inner and outer panel edges are separated by a rubber mounting, just such an insulative break is achieved. Until the present time, however, no satisfactory means has been found by which to install a seal or gasket in conjunction with a rubber mounting without using many screws or items which require much time during the assembly of the refrigerator component.

Much of the difficulty lies with the structure of the seals or gaskets. By far the most satisfactory seals are the type with a central hollow portion. This hollow forms a dead air space around the door or panel in which it is installed and insulates the interior of the unit from the surrounding atmosphere. At the same time, it gives the seal or gasket a compressible and resilient structure which allows a large width of the gasket to flatten against the surface with which it engages and thus it insures an adequate seal. The principal disadvantage with a hollow gasket, however, is that it cannot be bent or shaped around corners and the like without causing it to crimp and to collapse upon itself. To prevent this crimping and collapsing, the corners and bends in the form of the seal required by the various sized doors and panels to which it has to fit have been made and spliced in after extrusion and then set and cured or vulcanized. This, of course, requires that each gasket be custom built for its particular door or panel and that a large number of gaskets be made. Furthermore, this necessitates considerable added expense in manufacturing the gaskets and causes complications in the assembling of them.

One object of this invention is to develop a hollow seal or gasket for use on refrigerator doors which is inexpensively manufactured and easily assembled and bent to the desired contour without crimping.

Another object is to provide a linear seal that may be satisfactorily used both as a means for rapidly securing the variously shaped components of refrigerator doors together without bolts, screws, and the like and as a gasket between the door and cabinet.

Another object is to minimize expense and complication in the assembly of structures such as refrigerator doors requiring both a linear rubber mounting member for joining edges of door components together and also a linear rubber closure seal to seal the air space between peripheral portions of the door and cabinet.

Other objects and advantages will become apparent upon examination of the accompanying drawings in which like parts are denoted by like numerals.

Figure 1 is a front elevation of the inside of a refrigerator door showing the gasket or mounting of this invention as assembled with the door frame and central panel;

Fig. 2 is an enlarged cross-sectional view taken along line 2—2 in Fig. 1 and showing the mounting as assembled with the refrigerator door frame and inside or central panel;

Fig. 3 is a perspective of the mounting in the unlocked or unassembled position. This shows the relation and position of the various parts prior to assembly.

This invention comprises a novelly formed gasket of rubber or rubberlike material. From Figs. 2 and 3, it can be seen that the gasket is composed of a mounting portion 1 joining the edges of adjacent panels and a sealing portion 2 integral with the mounting portion 1. The mounting portion surprisingly controls the operation of the sealing portion for it is found that the aforementioned crimping and collapsing of the sealing portion is avoided when the seal is made integral with a resilient mounting of more massive and thicker section and is provided with a longitudinal web 3. The massive mounting body stiffens the seal and the web portion braces it to greatly reduce or eliminate the tendency for it to collapse when formed and bent.

The mounting portion 1 is characterized by a linear body with opposing grooves or channels 4 and 5 into which the panel edges fit. The flanges or groove-forming portions of the mounting body 6 and 7 together with the connecting portion 8 define the left hand groove or channel 4 and the flanges 9 and 10 together with the connecting portion 8 define the right hand groove 5. The grooves are generally oppositely disposed to each other or back to each other and act in the same planes or planes parallel to each other. That is, the grooves are roughly aligned with the plane passing through the mid-points at the innermost portion of each groove. The inner surface of each flange is preferably inwardly curved or concave to enable the flanges to grip and hold the panel edges throughout the width thereof. This eliminates any tendency for the gripping force of the flange to act only at the base or root of the groove.

Intermediate the grooves 4 and 5 and outward, and generally to one side of their median plane is a longitudinal opening or channel 11. The walls of this hollow are shaped to receive a plug or spreader element 12 and the hollow preferably has an inner V-shaped extension 13 to provide increased flexibility.

When the mounting is in the open or unlocked position as shown in Fig. 3, the upper or top flanges 6 and 10 on the sealing portion side of the median plane are fully flexible to and from each other and can be bent to open the channels 4 and 5 for easy reception of the panel edges. These flanges 6 and 10 are bendable toward each other relatively easily because there is no intervening mass or body of material or, in other words, the channel 11 is located between them. At the same time, the flanges 5 and 9 on the opposite side of the median plane are relatively stiff and immovable because the mounting portion between them is solid.

For assembly, the panel edges or in this case the edge of the refrigerator door frame 14 and the central panel 15 are inserted in grooves 4 and 5 respectively and the plug or spreader element 12 is forced into the channel 11 to expand the mounting and force the flanges 6 and 10 into tightgripping engagement with the panel edges. For this purpose the plug 12 should be of sufficient mass and thickness to be stable against transverse bending or folding, and proportioned or shaped to fill the channel or hollow 11. In this invention the plug 12 is integral with and hinged to the mounting portion along one wall or edge of the channel 11. Along the mounting portion forming the other side or wall of the channel 11 is an overhanging lip or bead 16. The plug element has a corresponding groove or recession 17 and bead 18 which fits underneath the lip 16 to hold and lock the plug in position.

This sealing portion or hollow bead 2 is formed integrally with and extruded as a part of the mounting and consequently is composed of the same rubber as the mounting. The general shape of the seal is arcuate or preferably ovate with a relatively flatter outer portion or top. The seal outline shape will naturally vary with the thickness of the side walls 19 of the seal and with the installation in which it is to be used.

The major feature of the present invention is the longitudinal web 3 in the seal portion. This web or cross-portion extends from the lower portion of the inner seal wall out to the upper part of the opposite outer wall and lies in a longitudinal plane at an acute angle to the plane of the opposing panel grooves. This web may be formed and extruded integrally with the seal and may be solid throughout. A function of the web is to brace and strengthen the walls of the hollow seal portion so that it can bend around sharp corners without crimping. The action of the web is to tie the lower inner wall portion to the outer upper wall portion so that the inner portion of the seal holds its shape. To increase this tendency, the lower portion of the inner wall is also preferably thickened and extended more toward the inner side of the mounting. This throws the center of gravity and bending radius inwardly to assist in obtaining a uniform shape in the straight and curved portions of the gasket.

As shown in Fig. 1, the gasket or mounting G of which only the sealing portion 2 shows, joins without other fastening or mounting means the edge or refrigerator door frame 14 with the edge of the inside panel 15 in a continuous length around the inside panel. This provides a complete heat break between the outside or door frame 14 and the interior or inside panel 14 and consequently very little heat can be readily conducted through the frame directly into the refrigerator. Any heat so entering must pass through the gasket which is of rubber or rubberlike material and thus insulative or relatively nonconductive of heat.

The sealing portion 2 flattens against the refrigerator body frame and excludes air and insulates against heat along the juncture of the door frame and body frame. In this way a complete heat seal is furnished in the gasket combination of the present invention.

The door frame 14 is preferably made of sheet steel or other metal with an enameled or vitreous finish and an outward curving or convex front face and side flanges 14-a bent back into a U shape so that there is an inturned open edge substantially about the entire peripheral portion of the door frame. These inturned flanges 14-a are generally parallel to the plane of the front of the refrigerator body when the door is closed. The central or inside panel 15 is preferably flat fiberboard or other nonheat-conductive material and fits into the opening in the inner face of the door frame to cooperate with the door frame and integral outer door portion (not shown) to completely enclose the insulation 20. The edges on both the door frame and panel do not have to be finished edges but do have to correspond roughly, taking into account the distance between opposing grooves of the mounting portion of the gasket.

The mountings and seals shown in this description are intended primarily for use on refrigerators, cabinets, and frozen food units, but they are equally serviceable under any conditions in which adjacent panel edges need to be joined and a seal or closure against a third panel surface is required. In other words, only preferred embodiments of the invention have been illustrated and described. Other embodiments may be made within the invention as provided by the patent statutes.

This application is a continuation-in-part of my application Serial No. 133,653, filed December 17, 1949.

What I claim is:

1. The combination of (1) a mounting portion for joining panel edges which mounting portion comprises a linear body of rubberlike material of uniform cross-sections with opposing grooves therein to receive panel edges, a longitudinal opening intermediate the grooves and generally to one side of a longitudinal plane passing through the base portions of said grooves and a plug element hingedly connected to said body along one edge of said longitudinal opening and proportioned for insertion into said opening to thereby expand the body of the mounting into tight gripping engagement with the panel edges and (2) a hollow, bulbous sealing portion integral with said plug element and extending outwardly from the mounting body with a longitudinal web portion therein.

2. The combination of (1) a mounting portion for joining panel edges which mounting portion comprises a linear body of rubberlike material of uniform cross-sections with opposing grooves therein to receive panel edges, a longitudinal opening intermediate the grooves and generally to one side of a longitudinal plane passing through the middle of the base portion of said grooves and a plug element hingedly connected to said body along one edge of said longitudinal opening and proportioned for insertion into said opening to thereby expand the body of the mounting into tight gripping engagement with the panel edges and (2) a hollow, bulbous seal integral with said plug element and extending outwardly from the mounting body on the same side of the plane through the midpoints of the opposing grooves as that of the plug element, said seal having integral therewith a longitudinal web portion in a plane at an acute angle to the plane through the midpoints of the opposing grooves.

3. A mounting for joining panel edges comprising a linear body of rubberlike material with opposing grooves therein to receive panel edges, a longitudinal opening intermediate the grooves, a spreader element for insertion into said opening to thereby expand the body of the mounting into tight gripping engagement with the panel edges, and a hollow ovate sealing portion formed integrally with said spreader element and extending outwardly from the mounting body and having therein a longitudinal cross-portion joining opposite seal walls.

4. The combination of (1) a mounting portion for joining panel edges which mounting portion comprises a linear body of rubberlike material of uniform cross section with opposing grooves therein to receive panel edges, a longitudinal opening intermediate the grooves and generally to one side of a longitudinal plane passing through the middle of the base portion of said grooves and a plug element hingedly connected to said body along one edge of said longitudinal opening and proportioned for insertion into said opening to thereby expand the body of the mounting into tight gripping engagement with the panel edges and (2) a hollow ovate seal integral with said plug element which has one side wall thickened along the lower portion thereof and which has an integral longitudinal web extending from the lower portion of the inner wall to the upper portion of the outer wall of the seal.

5. A mounting and hollow seal according to claim 1 further characterized in that the portions of both the mounting and of the seal are thicker on one side of the longitudinal plane that is generally perpendicular to planes through both of the said opposing grooves whereby the center of mass of said mounting and seal, while said plug element is in said opening, is on one side of said longitudinal plane and bending without kinking is obtainable.

HOWARD G. BECK.

REFERENCES CITED

The following references are of record in the file of this patent:

UNITED STATES PATENTS

| Number | Name | Date |
| --- | --- | --- |
| 2,263,806 | Hammerl | Nov. 25, 1941 |
| 2,366,894 | Ellsworth | Jan. 9, 1945 |
| 2,492,566 | Geyer | Dec. 27, 1949 |